No. 886,132. PATENTED APR. 28, 1908.
G. C. KENYON.
SHACKLE.
APPLICATION FILED DEC. 11, 1907.
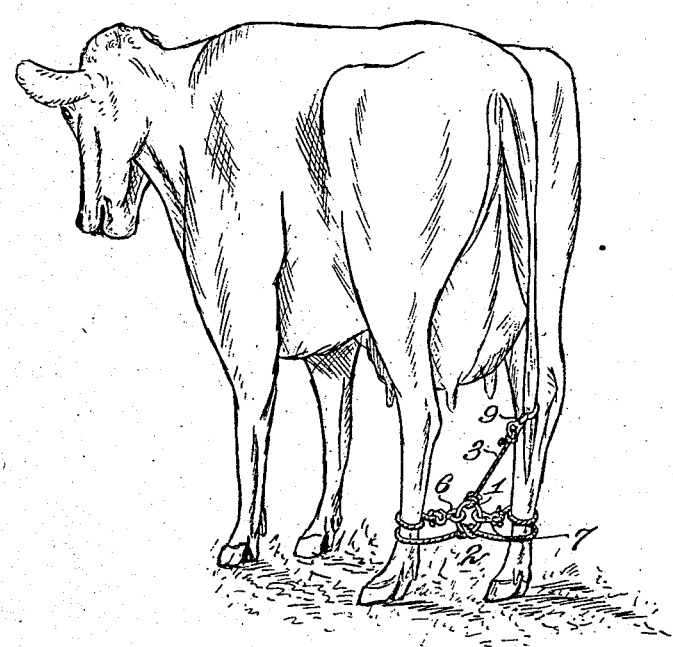
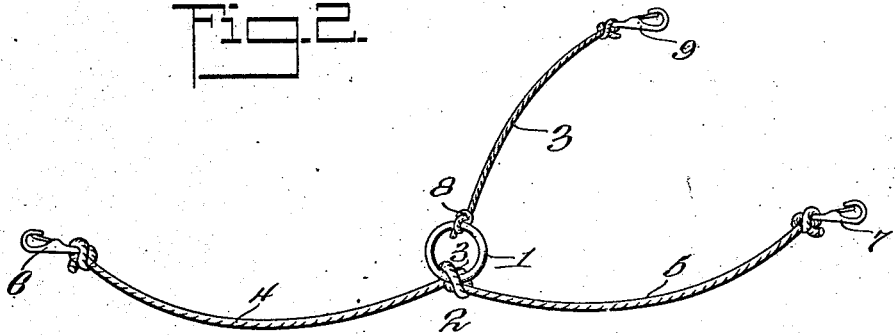

UNITED STATES PATENT OFFICE.

GEORGE C. KENYON, OF MOUNT CARROLL, ILLINOIS.

SHACKLE.

No. 886,132.     Specification of Letters Patent.     Patented April 28, 1908.

Application filed December 11, 1907. Serial No. 406,072.

*To all whom it may concern:*

Be it known that I, GEORGE C. KENYON, a citizen of the United States, residing at Mount Carroll, in the county of Carroll and State of Illinois, have invented new and useful Improvements in Shackles, of which the following is a specification.

This invention relates to shackles, and the object of the invention is to provide a simple, durable and inexpensive device of this character, especially designed for use in holding the legs of milch cows in such position that they cannot kick while being milked and also to provide an attachment to hold the animal's tail in position, so that it cannot switch around and interfere with the person milking the cow.

The invention is especially designed for use in connection with cows having acquired the habit of kicking while being milked, and it has been found that by applying my improved device to animals of this class that they soon become broken in and accustomed to stand quietly while being milked and the use of the shackle dispensed with when the animals are accustomed to standing without it.

It is another object of this invention to provide a device of this class which may be easily and quickly applied to animals of different sizes, and when once applied will hold the animal's legs as required to prevent them from kicking, and yet permit of sufficient movement of the animal's legs to enable the animal to acquire an easy and comfortable position while standing.

With these objects in view the invention resides in the novel construction of shackle and tail holder for cows hereinafter fully described and claimed.

In the drawings, Figure 1 is a view illustrating my improved device applied to a milch cow, and Fig. 2 is a perspective view of the device.

In the drawings the numeral 1 designates a metal ring, to which is applied the shackle element 2 and the cow tail holder 3. The shackle 2, employed in the contemplated form of my device is composed of a suitable strand of rope centrally knotted to the ring as at 3 and having the shackle members 4 and 5 extending in opposite directions from their point of connection with the ring 1. The shackle members 4 and 5 are each provided upon their extremities with spring clasps 6 and 7. The tail holder 3 is composed of a single strand of rope secured upon the eye or ring 1 as at 8, and is provided upon its free end with a spring clasp 9.

In applying my improved shackle and tail holder upon a cow one of the flexible shackle members is wound around one of the legs of the cow and its spring clasp secured upon the ring 1, and the opposite shackle member is likewise wound around the opposite leg of the cow and its clasp secured upon the ring 1 diametrically opposite the position of the other clasp. The clasp 9 of the flexible tail holder 3 is then fastened upon the tail of the animal. By this construction and arrangement of parts a milch cow is effectively prevented from kicking or switching its tail to the annoyance and inconvenience of the person milking the cow.

It will be understood that the flexible shackle members may be wound around the legs of the cow a sufficient number of times to correspond with the movement desired to be allowed to the cow's legs, and thus adapt the device to the different sizes of the cows to which it is to be applied.

From the foregoing description it will be noted that I have provided an extremely simple and efficient device for preventing milch cows from kicking while being milked and which also effectively holds the cow's tail in position so that it cannot switch around and interfere with the person milking the cow.

Having thus fully described the invention what is claimed as new is:

A device of the class described comprising a ring member, a flexible shackle secured to the ring member at its center and being provided with clasps upon each of its ends, and a flexible member having a clasp also secured to the ring.

In testimony whereof I affix my signature in presence of two witnesses.

GEORGE C. KENYON.

Witnesses:
FRED. S. SMITH,
ZELLA TUTER.